United States Patent [19]

Vayda, Jr.

[11] 4,189,031

[45] * Feb. 19, 1980

[54] SINGLE-STOP SHOPPING METHOD

[76] Inventor: Michael M. Vayda, Jr., 1600 S. Joyce St., Arlington, Va. 22202

[ * ] Notice: The portion of the term of this patent subsequent to Sep. 5, 1995, has been disclaimed.

[21] Appl. No.: 882,987

[22] Filed: Mar. 3, 1978

Related U.S. Application Data

[62] Division of Ser. No. 716,374, Aug. 23, 1976, Pat. No. 4,111,282.

[51] Int. Cl.[2] ............................................ C04H 3/04

[52] U.S. Cl. ............................................ 186/1 C

[58] Field of Search .......................... 186/1 C; 141/98

[56] References Cited

U.S. PATENT DOCUMENTS

| | | | |
|---|---|---|---|
| 2,435,755 | 2/1948 | Schimpff | 186/1 C |
| 3,536,109 | 10/1970 | Ginsburgh | 141/98 |
| 3,647,026 | 3/1972 | Alexander | 186/1 C |

*Primary Examiner*—Reinhard J. Eisenzopf

[57] ABSTRACT

A drive-in, single-stop shopping facility for simultaneously vending numerous retail products and fuel to a customer positioned at a fixed purchase station, e.g., a stationary automobile. A method for simultaneously vending retail products and fuel to such a customer. A kit for converting existing gas station buildings into drive-in, single stop shopping facilities of the type described.

1 Claim, 10 Drawing Figures

SINGLE-STOP SHOPPING METHOD

REFERENCE TO RELATED APPLICATION

This application is a division of my copending patent application, Ser. No. 716,374, filed Aug. 23, 1976, and now U.S. Pat. No. 4,111,282 granted on Sept. 5, 1978.

The present invention relates to vending and, more particularly to a drive-in, single-stop shopping facility and method for simultaneously vending numerous retail products and fuel to a customer positioned at a fixed purchase station such as in an automobile.

A drive-in facility for vending fuel to automobiles is well known in the art. Such a facility is typically referred to as a "gas station" or "service station". Typically, the facility is comprised of a lot, a building, and fuel pumps located apart from the building. To use this facility, a customer drives an automobile to a position adjacent to a fuel pump and gives a fuel order to an attendant who delivers the fuel to the tank inlet of the automobile. In recent years, some gas station operators have provided customer self-service fuel purchasing, usually at lower prices and employing an attendant only to collect money or to function as a cashier. On occasion, gas stations also sell retail items to the gas customers. For example, many gas station facilities may have candy or soft drink vending machines in or near the station building where the customer can on occasion get out of his car and purchase these items while waiting for the fueling of the automobile. In recent years, some facilities sell numerous retail products to customers who walk into the building during or following the purchase of fuel where they pay for both fuel and other products. Also, U.S. Pat. No. 3,095,020, shows that it is known to provide an automatic dispensing device for fuel only and a pneumatic conveyor means for payment between the customer and an attendant in the building.

While typical gas stations survive and still remain economic in certain circumstances, they are at a competitive disadvantage with present-day self-service stations, and neither of them are designed to simultaneously vend both retail products and fuel to a customer seated in an automobile.

Accordingly, an object of the present invention is to provide a single-stop shopping facility and method for vending retail products and fuel simultaneously to a customer on a means of conveyance such as an automobile.

Other objects of the present invention are to provide the customer a time saving, convenient and economical way to purchase retail products and fuel by: reducing customer waiting time; allowing the customer to make such purchases (including payment and receipt of products) from the privacy and safety of a stationary vehicle, thus allowing the customer to initiate the purchase decisions; reducing to one the total number of separate store visits or stops within a store to purchase the same selection of products; and reducing the unit selling cost of an equivalent selection of products.

Further objects of the present invention are to provide the operator of the facility with a more economical and convenient way to vend retail products and fuel by: allowing more intensive use of land and building space resulting in greater sales volume and profit; increasing the operator's capability of attracting and serving more customers per unit of time; lowering the labor costs per customer; increasing the total sales per customer visit; increasing the economic viability of a typical gas station operator's business by limiting his dependence on an unstable product such as fuel; and improving the security of the facility from embezzlement, vandalism and robbery.

Another object of the present invention is to provide a kit of various means for converting an obsolete typical gas station into a drive-in, single-stop shopping facility for vending retail products and fuel to a customer positioned at a fixed purchase station such as in an automobile.

Other objects and advantages of the present invention will be apparent to those skilled in the art by description of the preferred embodiments of the invention which follows.

According to one aspect of the present invention I provide a drive-in, single-stop shopping facility having means for warehousing a multiplicity of retail products and the various personnel involved in the vending of the retail products to the drive-in customer. Further, the facility includes dispensing means operable by an attendant for delivering fuel to the vehicles that are driven into the facility. The facility still further includes purchase selection means operable by a customer positioned on his means of conveyance and payment means operable by such customer, which purchase selection and payment means enable the customer to select from a variety of fuel and retail products, to order and pay for the same, all at one time and without requiring the customer to leave the comfort and safety of the means of conveyance. The drive-in facility is provided with means for directing traffic through the facility so that each customer arrives adjacent to the dispensing means and the purchase selection means. Furthermore, the facility includes means for passing a customer's retail product order from the interior of the warehousing means to the outside for delivery to the customer. All of the elements of the drive-in facility are operatively associated and arranged so that the customer's fuel and retail product purchases are accomplished simultaneously.

According to another aspect of the present invention, I provide a method for vending retail products and fuel in a fixed purchase station to a customer seated in a stationary vehicle. The method of vending includes the steps of directing the customer to a fixed position adjacent the dispensing means for delivering fuel to the customer, informing the customer of a fuel and retail product selection, communicating the customer's fuel purchase selections to an attendant who operates the fuel dispensing means, delivering the fuel purchase selection to the customer, communicating the customer's retail product purchase selection to a cashier and order clerk located within means for warehousing the retail products, communicating the total cost of the customer's fuel and retail product order to the customer, conveying payment from the customer to the cashier, conveying change and a receipt to the customer, passing the customer's retail product order from within the warehousing means to the outside thereof for delivery to the customer, and delivering the retail product order to the customer, all of the method steps being carried out in coordination so that the customer's fuel and retail product purchases are accomplished simultaneously.

According to a further aspect of the present invention, I provide a kit to convert an existing and/or obsolete gas station to a drive-in, single-stop shopping facility for simultaneously vending retail products and fuel.

The kit comprises a purchase selection means, a payment means, and means for passing the customer's retail product order from the inside of the station building to the outside thereof for delivery to the customer's vehicle. Also, the kit may optionally include means to convey the customer's retail product order from said building to the customer's vehicle.

Reference is now made to the accompanying drawing wherein like reference numerals and characters designate like parts and wherein:

FIG. 2 depicts the operative arrengement of the fuel pump, purchase selection means and payment means utilized according to one embodiment of the present invention.

Figure 1:
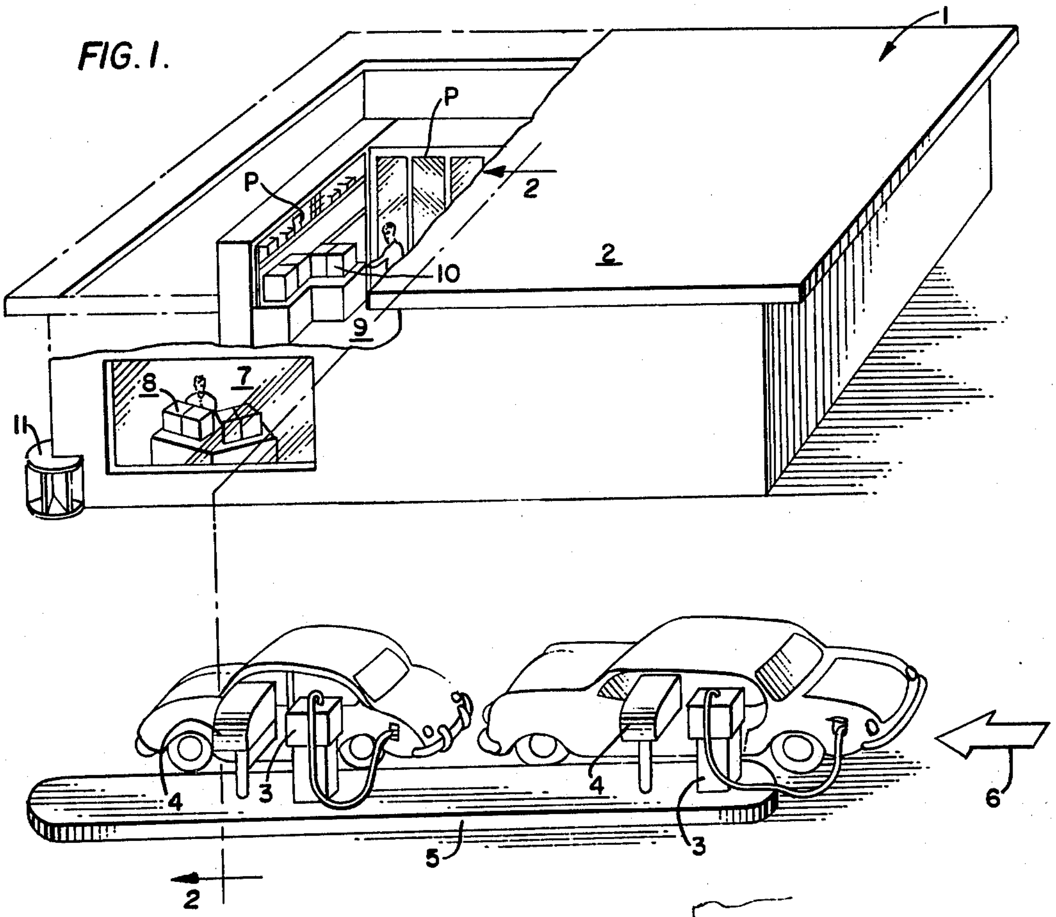
FIG. 1 is a cut-away perspective view of a drive-in, single-stop facility for vending retail products and fuel to a customer seated in a vehicle.

With particular reference to FIG. 1, 1 designates a drive-in, single-stop shopping facility for simultaneously vending retail products and fuel to a customer seated in an automobile according to one embodiment of the present invention. The facility includes a building 2 for warehousing the various retail products for sale at the facility and, as depicted by a cut-away view, for providing working space for the various personnel who operate the facility. Spaced at an appropriate distance from the warehouse building are fuel pumps 3 for delivering fuel to the automobiles of customers who drive into the facility. Adjacent each fuel pump are customer console units 4 containing purchase selection means and payment means operable by a customer seated in a stationary automobile. The customer console units 4 and the fuel pumps 3 are mounted on a traffic island 5 which is arranged so that the driver's side of the automobile is adjacent a customer console unit 4 at the same time that it is adjacent to the fuel pump 3. To insure automobile traffic flow in the desired direction, island 5 may be shaped to form a curbing (not illustrated). Also, the desired traffic flow may be facilitated by an indicator 6 in or on the driveway for visually directing the customers into the proper position for reaching the customer console units.

Figure 7:
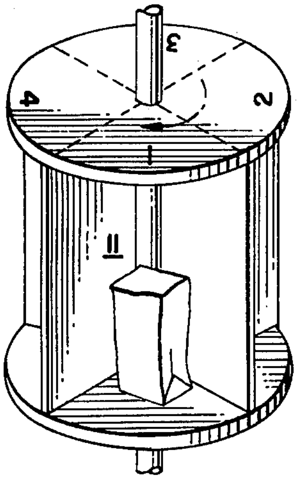
FIG. 7 is a partial perspective view of a retail product turnstyle which is mounted on the warehouse according to one embodiment of the present invention.

Housed within the building 2 are several functional areas to facilitate the retail product vending function. Thus, there is an area designated as a control area 7 wherein personnel may operate at a control console 8 to receive payment from the customer and to provide change and receipts to the customer for the total order of retail products and fuel. In addition, the building has a warehouse area 9 wherein order clerk personnel may operate at an order clerk console 10 to receive the desired retail product order from the customer, collect the order from the supply of products P, and bag the same. The personnel then may pass the order in a bag to the outside of the building through a product turnstyle device 11, a portion of which is shown in FIG. 7. Areas 7 and 9 may be arranged in relation to the turnstyle 11, so that the various areas are operated at the highest efficiency from a time and motion standpoint.

The drive-in, single-stop shopping facility depicted in FIG. 1 is similar in some respects to the typical gas or service station found around the United States. Many are obsolete or abandoned. However, as described herein, there are numerous novel changes and adaptations of such stations that must be made before the station can function as a facility for simultaneously vending retail products and fuel to the customer seated in a stationary automobile. To facilitate conversion of existing obsolete or abandoned gas stations, one aspect of the present invention involves a novel conversion kit. This kit may comprise a customer console unit 4, a control console 8, an order clerk console 10, and associated elements for their installation as more particularly described hereinafter.

Figure 2:
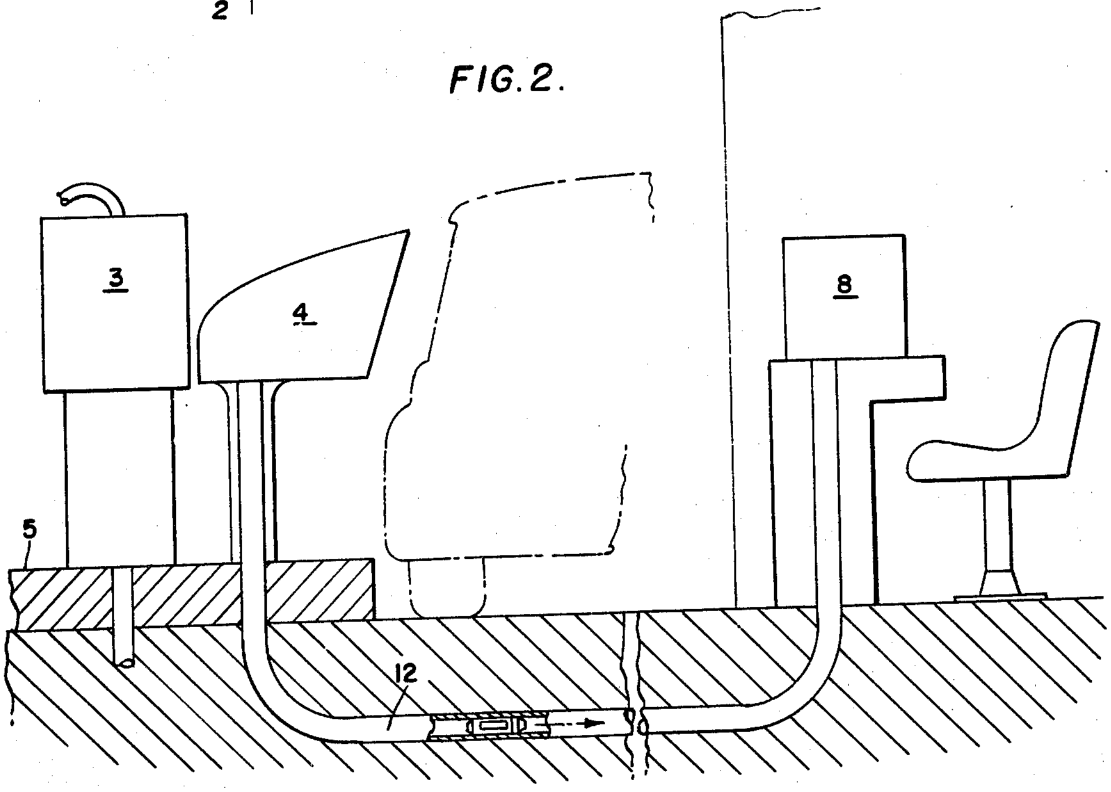
FIG. 2 is a partial cross-sectional view of a portion of FIG. 1.

FIG. 2 is a partial cross-sectional view along line 2—2 of FIG. 1. FIG. 2 depicts the operative association of the fuel pump 3, the customer console unit 4 (both located on the traffic island 5), the control console 8 located in the control area of the building and a means 12 for conveying payment between the customer console unit 4 and the control console 8. The payment conveying means depicted in FIG. 2 is a pneumatic system which carries the customer's money or credit card from the customer console unit 4 to the control console 8 where the cashier receives it and makes appropriate operations to return receipt and change to the customer. The change and receipt are transferred to the customer from control console 8 in a reverse manner by the pneumatic system. It should be understood that there are many ways that the payment can be automatically conveyed between the costomer and the cashier in addition to the conveying means 12 depicted. Likewise, there are many other alternative means by which the receipt and change may be returned from the cashier to the customer seated in the automobile. Thus, the pneumatic system shown is an illustrative embodiment of one conveyer according to the present invention. In the case of purchases of small retail products, the means for conveying payment, etc. may also be used to convey a retail product from the warehouse to the customer. Other conveyors may be used in the case of larger products.

Figure 3:
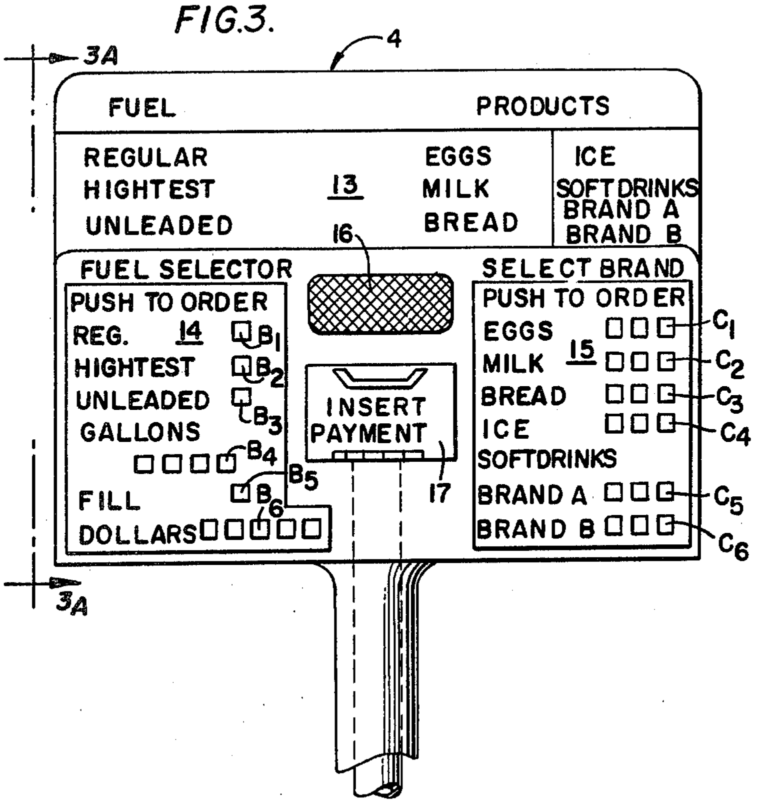
FIGS. 3A and 3B are front and side views, respectively, of a customer console unit according to one embodiment of the present invention.

FIG. 3 illustrates the details of the customer console unit 4 according to one embodiment of the present invention. Console 4 consists of a display means 13 for showing the customer a selection of retail products and fuel for sale at the shopping facility. For example, display 13 may show the various types of gasoline that may be ordered and the unit price of the fuel. Furthermore, the display means 13 may list the various retail products that are available at the facility and the unit prices of those products. The product and fuel selection may also be presented orally to the customer. It should be understood that the display 13 is immediately adjacent the customer seated in the automobile and is basically at eye-level to facilitate the customer's easy and convenient review of the fuel and retail products available for sale. FIG. 2 shows the close arrangement of a customer console 4 and the window of an automobile shown in phantom lines. Located beneath the display 13 on the customer console 4 are means to facilitate the customer's communication of his order for retail products and fuel to the personnel at the facility. Thus, there is a fuel selector 14 and a product selector 15 which may take various equivalent forms, either electrical or mechanical. In the embodiment shown, fuel selector 14 involves buttons $B_1 \ldots B_6$ which are appropriately labeled to allow the customer to select the type of fuel and the quantity thereof either in gallons or in dollar amounts. Many other means could be utilized to perform the same function, as for example a series of dials could be operated manually by the customer or other types of switches or electronics. The product selector 15 depicted in FIG. 3 also utilizes a series of push buttons $C_1 \ldots C_6$ by which the customer may designate the various retail products and the brand and quantity thereof desired to be delivered to the automobile. Just as in the case of the fuel selector 14, the product selector 15 may take various forms including mechanical dial means or equivalent electronic selecting means. Associated with the fuel and product selectors on the customer console unit 4 is a microphone and speaker 16 by which the customer can communicate with personnel located inside of the building. This allows the customer to verbally communicate requests to the personnel located in the building further enabling the customer to remain in the seat of the stationary automobile during the entire purchase and payment for fuel and retail products.

Figure 3A:
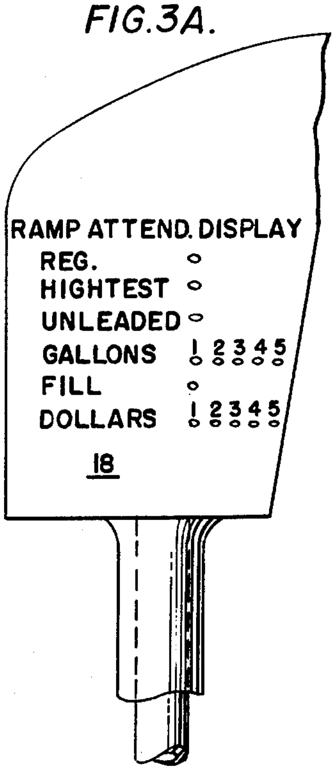

Also located on customer console unit 4 is a payment means 17 which is operable by the customer to convey the payment to a cashier located in the building in control area 7. A door on payment means 17 leads to the pneumatic system described in connection with FIG. 2. The door is the focal point for payment, change, and receipt to the customer located in his stationary automobile. FIG. 3A illustrates a side view of the customer console unit 4 and shows one embodiment whereby the fuel selection of the customer is communicated to a ramp attendant whose job it is to fill the fuel tank of the customer's automobile. Thus, in FIG. 3A, the customer console unit 4 also has a ramp attendant light display means 18 that indicates to the ramp attendant the type and amount of fuel selected by the customer. Other types of equivalent display means may be used. One advantage of the ramp attendant display means 18 is that the ramp attendant may visually determine the exact fuel order of the customer without approaching the customer and without obtaining oral instructions as to the order. Thus, the ramp attendant need only approach the rear end of the customer's car with the fuel nozzle and can deliver the customer's order without any face-to-face involvement with the customer. An advantage of this is that the customer may devote his full attention to ordering his retail products after designating his fuel selection on the customer console unit 4. This enables the process of fueling and purchasing of retail products to proceed simultaneously by the customer seated in one location. The ramp attendant display means 18 also may provide the attendant with information related to other automotive requirements so that he doesn't have to engage in conversation with the customer.

Figure 4:
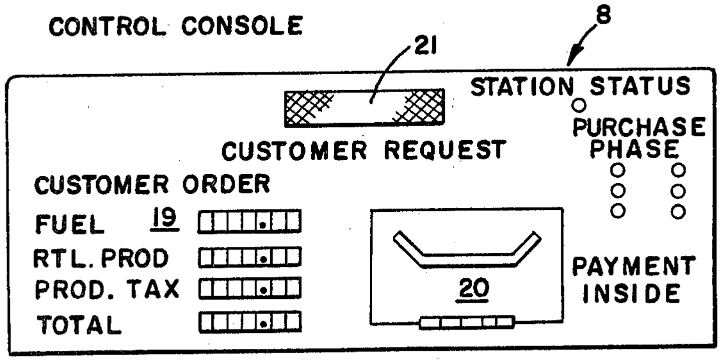
FIG. 4 is a schematic front view of the panel of the control console according to one embodiment of the present invention.

FIG. 4 depicts the details of a control console 8 utilized in the control center area 7 of the facility. In the embodiment shown, the control console 8 has display means 19 for showing the cashier the total dollar amount of the retail product and fuel order requested by the customer seated in his automobile. The control console 8 for the cashier is similar to the customer console unit 4 in that there is provided a payment-receiving and transmitting means 20 and a microphone/speaker 21 which are operatively associated with the payment conveyor 12 and the customer's microphone/speaker 16. It should be understood that, when the facility has a multiplicity of fuel pumps and customer console units, thereby being capable of serving a multiplicity of automobiles simultaneously, a similar multiplicity of control consoles 8 are provided for the cashier to operate in the control center area of the building. The control console may also have means to inform the cashier that there is a customer at a specific customer console unit. Also, there may be an indicator for the stages of a particular customer transaction.

Figure 5:
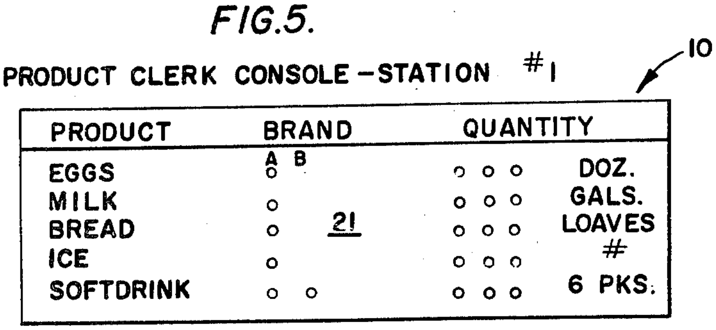
FIG. 5 is a schematic front view of the panel of the order clerk's console according to one embodiment of the present invention.

FIG. 5 is a schematic view of a console 10 provided for the order clerk located in the warehouse area 9 of the building. The order clerk console 10 has light display means 21 for communicating the product, brand, and quantity of a variety of retail products that the customer has ordered. Thus, similar to the situation described above in connection with a multiplicity of control consoles, there is a one-to-one relationship of order clerk consoles 10 to the number of control consoles 8 and customer console units 4.

Figure 6:
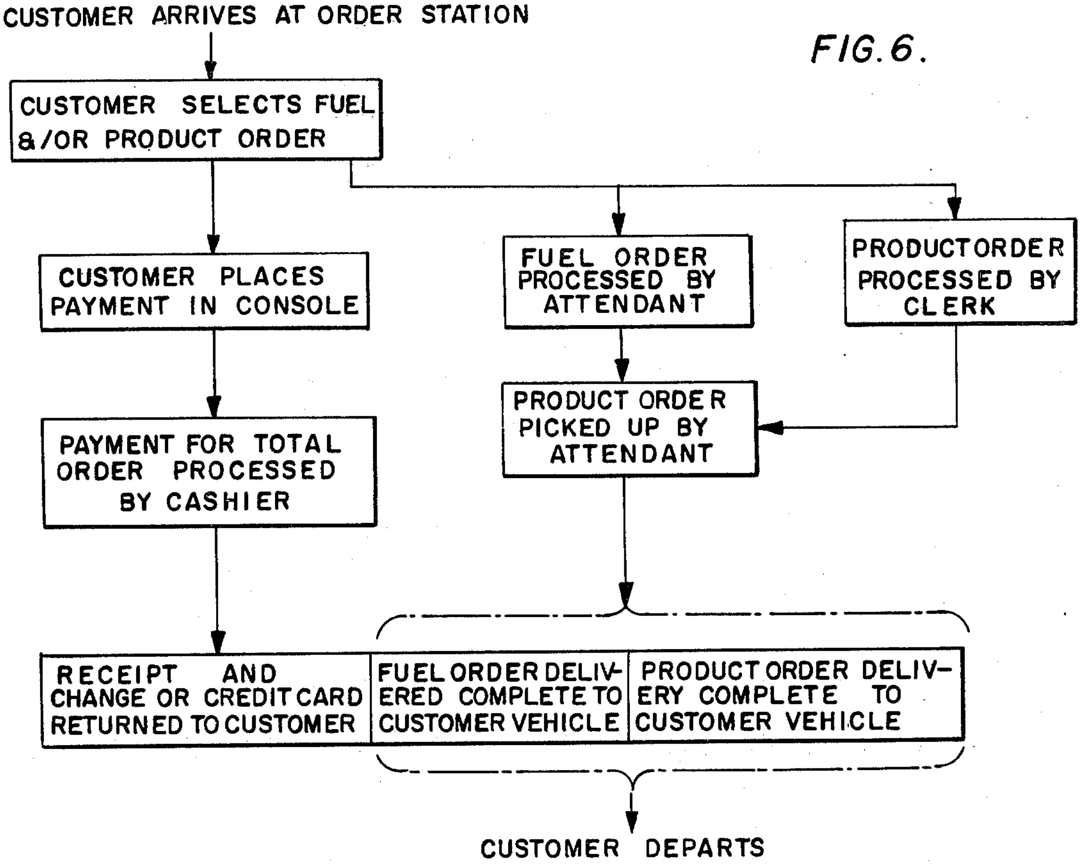
FIG. 6 is a generalized flow diagram depicting an embodiment of the method of the present invention.

FIG. 6 is a generalized flow diagram for illustrating one embodiment of the method according to the present invention for simultaneously vending retail products and fuel to a customer seated in an automobile. The initial step in carrying out the method is directing of the customer to a position adjacent the dispensing means for delivering fuel into the automobile. At this position, the next step of the method is informing the customer of the selection of retail products and fuel for sale at the facility. After the customer has made a selection of fuel and/or retail products, the next step of the method is the communicating of the fuel purchase selection to an attendant who performs the subsequent step of delivering the desired fuel purchase to the customer's automobile. At approximately the same time, the additional step of communicating the customer's retail product purchase to a cashier and order clerk is performed. The cashier, who is located in the building for warehousing retail products, may perform the step of communicating the total cost of the customer's fuel and retail product order to the customer preparatory to the payment phase of the method. Upon being advised of the total payment required, the next step of the method is the conveying of a payment from the customer to the cashier, followed by the step of conveying change and a receipt to the customer. During the time period when the attendant is delivering fuel products to the customer's automobile and the cashier is consummating the payment steps with the customer, an order clerk is engaged in processing the retail order purchases for the customer. Upon assembly and bagging of the order, the clerk performs the step of passing the retail order from within the warehouse building to the outside for delivery to the customer's automobile. Depending upon the personnel needs and volume of business being satisfied by the method, either the attendant or other personnel deliver the retail product order to the customer. In the above method it should be apparent that various functions are being performed simultaneously to enable the customer to make retail product and fuel purchases in the minimal amount of time.

Figure 8:
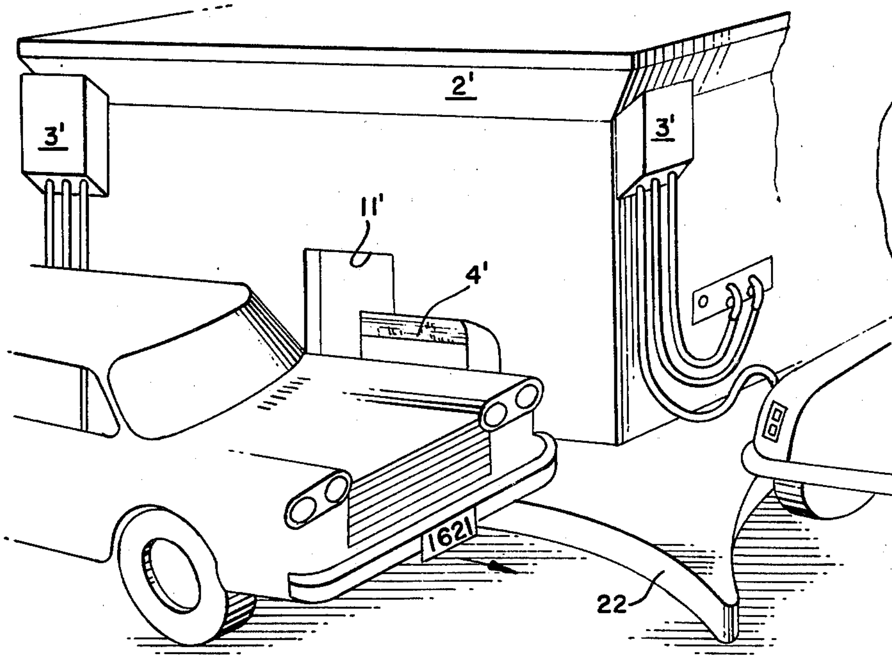
FIG. 8 is a perspective view of a drive-in, single-stop shopping facility according to a further embodiment of the present invention.
Figure 9:
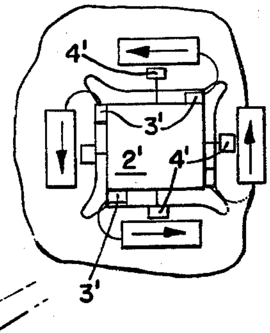
FIG. 9 is a schematic plan view of a drive-in, single-stop shopping facility according to a further embodiment of the present invention.

FIGS. 8 and 9 illustrate an operative association of means according to an alternative embodiment of the present invention. In FIG. 8, the fuel dispensing means 3' is associated with the building 2' which provides a warehouse for the facility. Also, the purchase console unit 4' is moved to adjoin the building. Furthermore, the means 11' for passing the customer's retail product order from within the building to the customer's automobile is constructed and arranged so that the retail product order can be passed directly to the customer in a stationary automobile. In the embodiment of FIGS. 8 and 9, four separate segments of the drive-in, single-stop shopping facility are arranged around the periphery of the building 2', thus enabling four automobiles to be handled simultaneously. In this alternative embodiment, four separate driveways are provided so that each side of the facility can serve one line of cars without there being undue congestion. To aid in this, a curbing 22 may be used to direct automobiles in the proper approach to the drive-in, single-stop shopping facility. It should be apparent that the number of purchase stations may be greatly expanded depending upon the size and shape of the building.

The term "automobile", as used in the present application, is meant to define any means of conveyance in a generic sense. Furthermore, the term "retail products" as used in the present application is meant to define any retail product or service since it should be apparent that services such as dry cleaning, film processing, and banking services could also be simultaneously provided to a customer seated in an automobile. Also, the terms "attendant", "cashier" and "order clerk" are not meant to rule out the possibility that one person might perform more than one function such as, for example, when the cashier and order clerk are the same person.

The various aspects of the present invention has been described in detail with particular reference to preferred embodiments thereof, but it will be understood that variations and modifications can be effected within the spirit and scope of the invention as described here and above and as defined in the appended claims.

I claim:

1. A method of dispensing fuel and retail products to customers respectively at first and second automobiles, the method comprising the steps of:

(a) providing a facility having means for warehousing said retail products and having first and second fuel dispensing means for dispensing fuel to said first and second automobiles;

(b) directing said first and second automobiles to respective positions adjacent said first and second fuel dispensing means;

(c) providing first and second purchase selection means operable by said customers respectively at said first and second automobiles;

(d) providing first and second payment means operable by said customers respectively at said first and second automobiles;

(e) receiving a fuel and retail product selection from the customer at said first automobile with said first purchase selection means;

(f) dispensing fuel from said first fuel dispensing means to said first auto to comply with the fuel purchase selection received from the customer at said first automobile;

(g) dispensing a retail product order from said warehousing means to said first automobile to comply with the retail product selection received from the customer at said first automobile;

(h) dispensing fuel from said second fuel dispensing means to said second automobile to comply with the fuel purchase selection received from the customer at said second automobile;

(i) dispensing a retail product order from said warehousing means to said second automobile to comply with the retail product selection received from the customer at said second automobile;

(j) receiving payment from the customer at said first automobile with said first payment means;

(k) receiving payment from the customer at said second automobile with said second payment means; and (l) carrying out steps (a) through (k) during substantially the same time frame so that both customer's respective fuel and retail product selections can be independently dispensed to the customers respectively at said first and second automobiles during the same time frame.

* * * * *